United States Patent
Berens (10) Patent No.: US 8,625,653 B2
(45) Date of Patent: Jan. 7, 2014

(54) METHOD FOR MANAGING THE OPERATION OF A WIRELESS APPARATUS CONFIGURED TO EXCHANGE INFORMATION WITH A MILLIMETER-WAVE COMMUNICATION DEVICE, AND CORRESPONDING APPARATUS

(75) Inventor: Friedbert Berens, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 800 days.

(21) Appl. No.: 12/392,286

(22) Filed: Feb. 25, 2009

(65) Prior Publication Data

US 2009/0213901 A1    Aug. 27, 2009

(30) Foreign Application Priority Data

Feb. 27, 2008    (EP) .................................... 08151976

(51) Int. Cl.
*H04B 1/00* (2006.01)
(52) U.S. Cl.
USPC ........... 375/130; 375/219; 375/141; 375/295; 455/454; 455/73; 455/63.4
(58) Field of Classification Search
USPC ............ 375/130, 219, 141, 295; 455/454, 73, 455/63.4
See application file for complete search history.

(56) References Cited

U.S. PATENT DOCUMENTS

| | | | |
|---|---|---|---|
| 2003/0224801 A1* | 12/2003 | Lovberg et al. | 455/454 |
| 2007/0109185 A1* | 5/2007 | Kracke et al. | 342/357.09 |
| 2007/0171997 A1* | 7/2007 | Weissman et al. | 375/297 |
| 2008/0311851 A1* | 12/2008 | Hansen et al. | 455/41.2 |

FOREIGN PATENT DOCUMENTS

| | | | |
|---|---|---|---|
| GB | 2393077 A | 3/2004 | H04Q 7/36 |
| WO | 03/049409 A2 | 6/2003 | |

OTHER PUBLICATIONS

Ash, J.N. et al., "Locating the Nodes," IEEE Signal Processing Magazine, Jul. 2005, pp. 54-69.
Kohno, R., "State of Arts in Ultra Wideband (UWB) Wireless Technology and Global Harmonization," 34th European Microwave Conference, 2004, pp. 1093-1099.

* cited by examiner

*Primary Examiner* — Leila Malek
(74) *Attorney, Agent, or Firm* — Allen, Dyer, Doppelt, Milbrath & Gilchrist, P.A.

(57) ABSTRACT

A wireless apparatus includes a millimeter-wave communication interface configured to exchange information within a millimeter-wave communication network, an UWB communication interface and circuitry configured to activate the UWB interface for communicating location indication to the communication network according to an UWB communication standard. The location indication is intended for locating the wireless apparatus within the network.

13 Claims, 9 Drawing Sheets

METHOD FOR MANAGING THE OPERATION OF A WIRELESS APPARATUS CONFIGURED TO EXCHANGE INFORMATION WITH A MILLIMETER-WAVE COMMUNICATION DEVICE, AND CORRESPONDING APPARATUS

FIELD OF THE INVENTION

The invention relates to the field of communications, and more particularly to the communications within a millimeter-wave communication network.

BACKGROUND OF THE INVENTION

A non-limiting application relates to a 60 GHz communication system. The frequency band around 60 GHz has been opened up for the use as a licensed free band. Based on this regulatory allocation, the IEEE has established a new standard group as part of the WPAN standard family (802.15.3c).

The main advantage of the 60 GHz range is the very high allowed transmit power of up to 57 dBm EIRP (Equivalent Isotropically Radiated Power) which is much higher than the available power in the Ultra Wide Band (UWB) bands (around −10 dBm over all power EIRP).

The basic channel properties in the 60 GHz band show a much higher attenuation than the UWB channels in the bands below 10 GHz. However, for the mm-Wave band NLOS (Non Line Of Sight), transmissions may be possible in limited cases. In most cases an LOS (Line of Sight) transmission is possible using very high transmit (TX) powers.

Some implementations propose an omnidirectional mode of the 60 GHz system with, however, a limited reach. To obtain a high TX power on the air, it is preferred to implement directive antenna systems with high gains (15 dBi to 30 dBi, or even above).

Thus, for normal use, it would be convenient for the user to be able to have a system that can steer the antenna beam to the right direction for simplifying the set up of the connection. It is possible to control the direction of the antenna beam by a scanning process. However, for very high gain antennas, the antenna beams are very narrow and thus, it would take a long time to get an idea of the environment. Furthermore, the scanning process is time consuming due to the small antenna beam on both sides. Increasing the antenna beam would also reduce the antenna gain and thus the reach of the system.

SUMMARY OF THE INVENTION

According to an embodiment, a method for managing the operation of a wireless apparatus permits knowing the position of the access points, stations, or the stream endpoints in an environment without having to scan the complete area.

According to an aspect, a method is for managing the operation of a wireless apparatus comprising a millimeter-wave communication interface configured to exchange first information with at least one other millimeter-wave communication device. The method comprises providing the apparatus with an UWB communication interface and activating the UWB interface for exchanging second information with the at least one other millimeter-wave communication device according to an UWB communication standard, the second information being intended for locating the wireless apparatus with respect to the at least one other millimeter-wave communication device.

The second information may include indication intended for determining a Direction of Arrival of signals exchanged between the wireless apparatus and the at least one other device. The second information may comprise an indication intended for determining ranging indication.

The method may further comprise receiving through the UWB interface another indication representing the position of the at least one other device. The at least one other device may be an access station of a millimeter-wave communication network including several access stations, or a wireless millimeter-wave communication apparatus.

Thus, a simple omnidirectional system offering location accuracy is possible to avoid a scan in an mm-Wave band, for example, the 60 GHz band. This system can be a UWB (high data rate, low data rate, location tracking system) system operating in the frequency band below 10 GHz. Here, the conditions for an omnidirectional operation are much better, and the location capabilities are much higher than in the case of a 60 GHz system.

Further, the combination of the two systems may lead to a simpler implementation of very high data rate systems without damaging the possibilities of an omnidirectional communication system. According to an embodiment, the millimeter-wave communication interface comprises a first omnidirectional antenna and is configured to exchange information within a first frequency band corresponding to a millimeter wave, and the method further comprises activating the millimeter-wave communication interface to exchange information with the at least another device within the first frequency band.

According to an embodiment, the millimeter-wave communication interface comprises a first antenna, and the method further comprises steering the first antenna towards the at least another device in accordance with the received another indication or with the determined Direction of signals Arrival, and activating the millimeter-wave communication interface to exchange information with the at least one other device within the first frequency band.

According to an embodiment, the steering step comprises steering the first antenna towards the at least another device in accordance with the received another indication or with the determined Direction of signals Arrival. According to an embodiment, the method further comprises keeping the UWB interface active during activation of the millimeter-wave communication interface.

According to an embodiment, activating the UWB interface comprises controlling the UWB interface according to a low duty cycle (LDC) operation mode. Although not limited to this particular embodiment, the millimeter-wave communication interface may be a 60 GHz communication interface.

The UWB interface may be configured to exchange information in a frequency band below 11 GHz. The UWB communication standard may be a WiMedia® standard.

According to another aspect, a wireless apparatus comprises a millimeter-wave communication interface configured to exchange first information with at least one other millimeter-wave communication device, an UWB communication interface, and control means or circuitry configured to activate the UWB interface for exchanging second information with the at least one other device according to an UWB communication standard, the second information being intended for locating the wireless apparatus with respect to the at least one other millimeter-wave communication device.

The UWB interface may comprise an UWB omnidirectional antenna or an UWB antenna array. According to an embodiment, the millimeter-wave communication interface comprises a first omnidirectional antenna and is configured to exchange information within a first frequency band corresponding to a millimeter wave, and the control means or circuitry are configured to activate the millimeter-wave communication interface to exchange information with the at least one other device within the first frequency band.

According to an embodiment, the millimeter-wave communication interface comprises a first antenna and is configured to exchange information within a first frequency band corresponding to a millimeter wave. The millimeter-wave communication interface is configured to steer the first antenna toward the at least one other device in accordance with the received another indication or with the determined Direction of signals Arrival. The control means or circuitry are configured to activate the millimeter-wave communication interface to exchange information with the at least one other device within the first frequency band.

According to an embodiment, the steering means or circuitry are configured to automatically steer the first antenna toward one of the access stations in accordance with the received another indication or the determined Direction of signals Arrival.

According to an embodiment, the control means or circuitry are further configured to keep the UWB interface active during activation of the millimeter-wave communication interface. According to an embodiment, the wireless apparatus further comprises UWB control means or circuitry configured to control the UWB interface according to a low duty cycle (LDC) operation mode.

BRIEF DESCRIPTION OF THE DRAWINGS

Other advantages and features will appear on examining the detailed description of embodiments, these being in no way limiting, and of the appended drawings, in which.

DETAILED DESCRIPTION OF THE PREFERRED EMBODIMENTS

Figure 1:
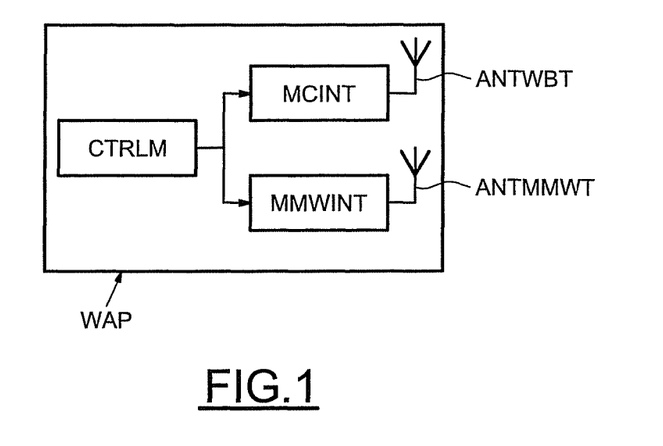
FIG. 1 illustrates schematically an embodiment of a wireless apparatus according to the invention.

With reference to FIG. 1, a wireless apparatus WAP comprises a typical UWB interface MCINT provided with an omnidirectional UWB antenna ANTWBT. The wireless apparatus also comprises a typical millimeter-wave communication interface MMWINT provided with a corresponding antenna ANTMMWT.

The millimeter-wave communication interface is configured to exchange information within a first frequency band corresponding to a millimeter wave. For example, the millimeter-wave communication interface MMWINT may be a 60 GHz communication interface, i.e. an interface configured to operate in the 60 GHz band (more precisely 57-66 GHz in Europe). This interface MMWINT is intended to operate according to the regulations of the 802.15.3c WPAN (Wireless Personal Area Network) standard at 60 GHz. The UWB interface MCINT is adapted to operate according to an UWB standard in the band below 11 GHz, for example between 3.1 GHz to 10.6 GHz.

UWB radio technology is known by the man skilled in the art and departs from narrow band radio and spread-spectrum technologies in that the bandwidth of the signal is large, typically at least 500 MHz wide. According to another definition, the UWB technology is a technology for short-range radio communication, involving the intentional generation and transmission of radio-frequency energy that spreads over a very large frequency range, which may overlap several frequency bands allocated to radio communication services. Devices using UWB technology typically have intentional radiation from the antenna with either a −10 dB bandwidth of at least 500 MHz or a −10 dB fractional bandwidth greater than 0.2. Further, a non-limiting example of an UWB standard may be a Wimedia® standard which incorporates Media Access Control ("MAC") layer and Physical ("PHY") layer certifications based on Multi-Band Orthogonal Frequency Division Multiplexing (MB-OFDM). For further details concerning the MAC layer and the PHY layer of the communication interface, the man skilled in the art may refer to the High Rate Ultra Wideband PHY and MAC Standard, Standard ECMA-368, $1^{st}$ edition, December 2005, and to the MAC-PHY Interface for ECMA-368, Standard ECMA-369, $1^{st}$ edition, December 2005, which is incorporated herein by reference.

The wireless apparatus may also use UWB technology with a low duty cycle (LDC) in the frequencies band 3.4-4.8 GHz. An UWB LDC apparatus has limitations based on burst duration and burst intervals. And, such an UWB LDC apparatus is allowed in Europe without time limits with a transmission power of −41, 3 dBm/MHz in a band which is at present between 3.4 GHz and 4.8 GHz. With this respect, the man skilled in the art may also refer to the IEEE 802.15.4a standard related to the LDR operating mode, which is also incorporated here by reference.

This LDC mode will permit an interoperability with UWB devices (as for example, 2G devices) provided with DAA (Detect And Avoid) mechanism and operating in the band 3.4 GHz to 4.8 GHz. If in the future, the band of frequencies allocated to UWB devices operating in the LDC operating mode includes also the band 3.1 to 3.4 GHz, this LDC mode will permit an interoperability with UWB devices (as for example 2G devices) provided with DAA mechanism and allowed to operate in the full band 3.1 GHz to 4.8 GHz.

The LDC mode includes limitations based on burst duration and time intervals between bursts. A burst is here an emitted signal whose time duration (Ton) is not related to its bandwidth. Further, the time interval (Toff) is the time interval between two consecutive bursts when the UWB emission is kept idle.

The duty cycle is defined here as the ratio, expressed as a percentage, of the transmitter sum of bursts duration "on" relative to a given period. For the LDC limitation, this given period is the second and the hour.

Thus, the limitations for the LDC mode are the following:
Ton max=5 ms
Toff mean≥38 ms (averaged over 1 second)
Σ Toff>950 ms per second
ΣTon<5% per second and 0, 5% per hour.

The wireless apparatus WAP also comprises control means or circuitry CTRLM configured to activate selectively, simultaneously or sequentially, both interfaces. The control means or circuitry may be at least one logic circuit or may be executable instructions executed by microprocessor.

The wireless apparatus WAP is intended to exchange first information in the first frequency band with at least one access station of a millimeter-wave communication network. This network comprises several access stations, one of which being diagrammatically illustrated in FIG. 2.

Figure 2:
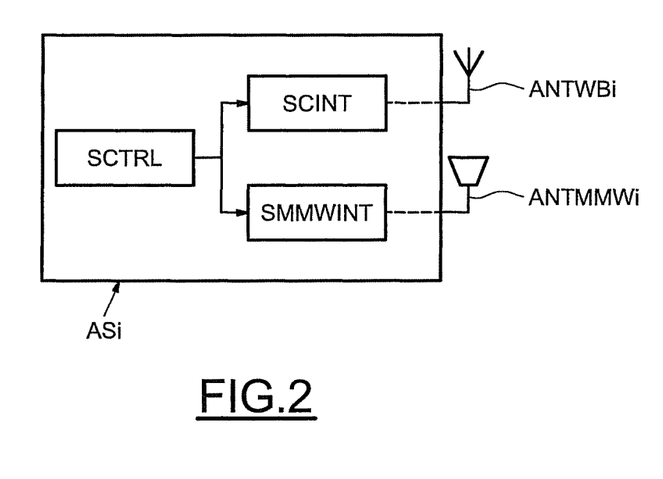
FIG. 2 illustrates schematically an embodiment of an access station according to the invention.

This access station ASi also comprises an UWB interface SCINT provided with an UWB antenna ANTWBi, and a millimeter-wave communication interface SMMWINT provided with a millimeter-wave antenna ANTMMWi. This antenna ANTMMVi is preferably a 60 GHz directional antenna, while the UWB antenna ANTWBi is for example, an omnidirectional antenna.

The access station ASi also comprises control means or circuitry SCTRL configured to activate selectively, sequentially or simultaneously, both interfaces of the access station. According to a possible but non-limiting application, it is also proposed a method of managing the operation of a millimeter-wave communication network configured to exchange information within a first frequency band corresponding to a millimeter wave, comprising receiving location indication from a millimeter-wave wireless communication apparatus according to an UWB communication standard, and determining the position of the millimeter wireless communication apparatus within the network from the received location indication.

The method further comprises selecting an access station depending on the position and exchanging information between the selected access station and the wireless apparatus in the first frequency band. The location indication are received by at least three access stations, and determining the position of the wireless apparatus comprises estimating at least three ranges between the at least three access stations and the wireless apparatus respectively.

Figure 3:
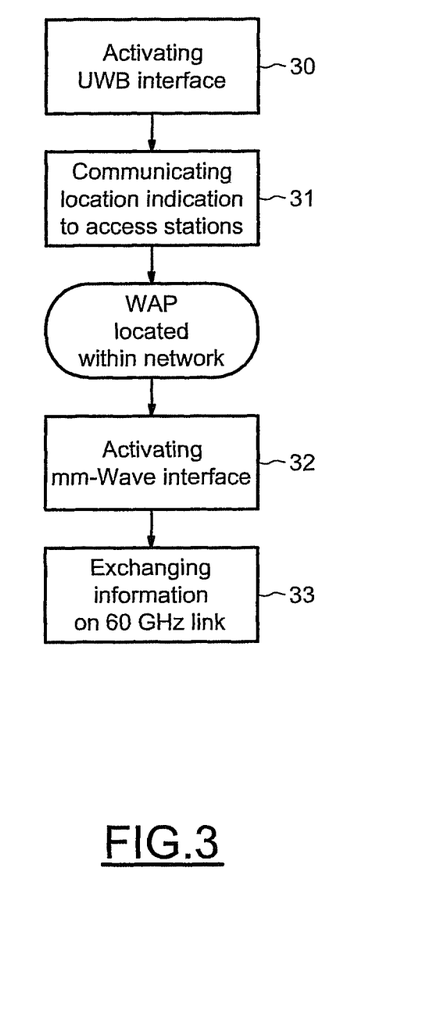
FIGS. 3 to 7 illustrate embodiments of a method according to the invention.
Figure 4:
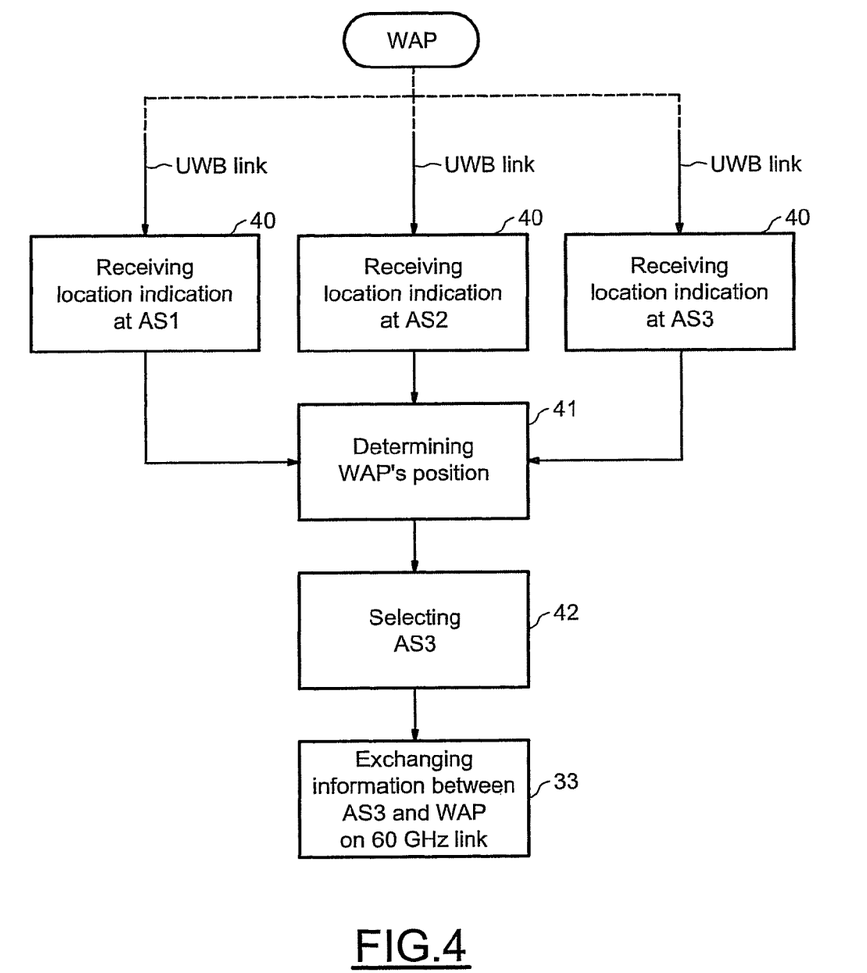
Figure 5:
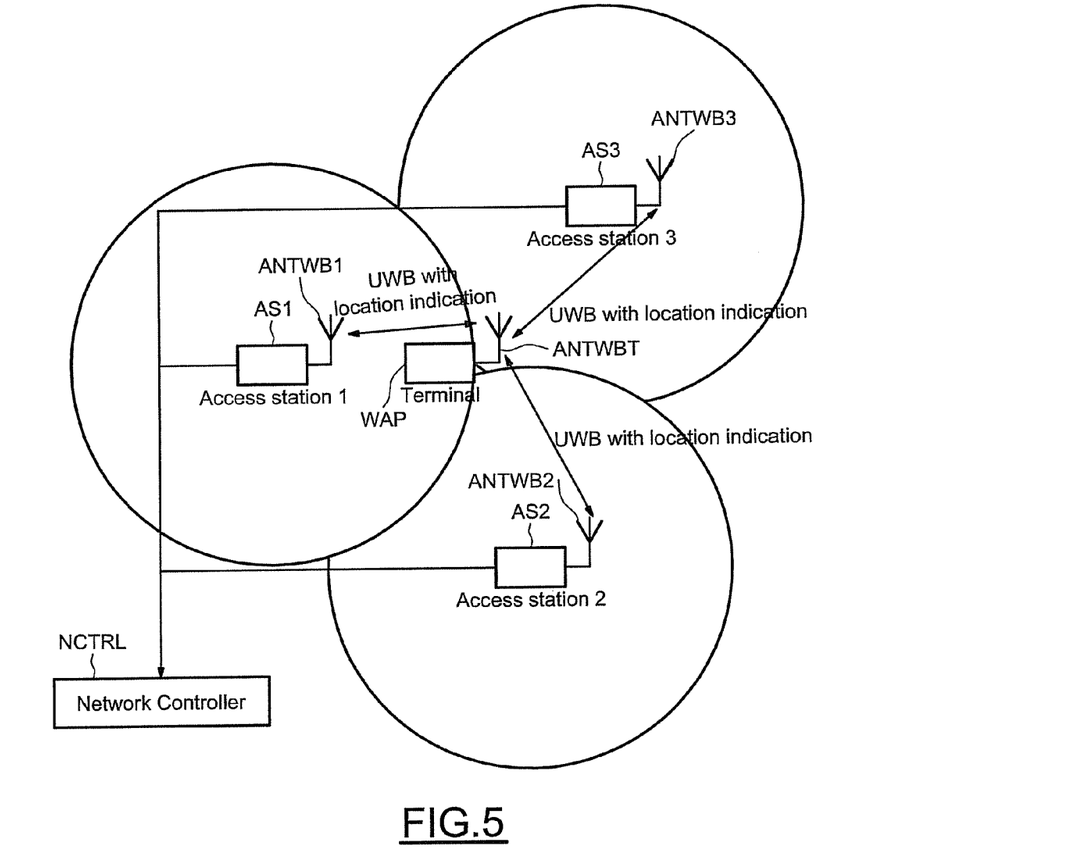
Figure 6:
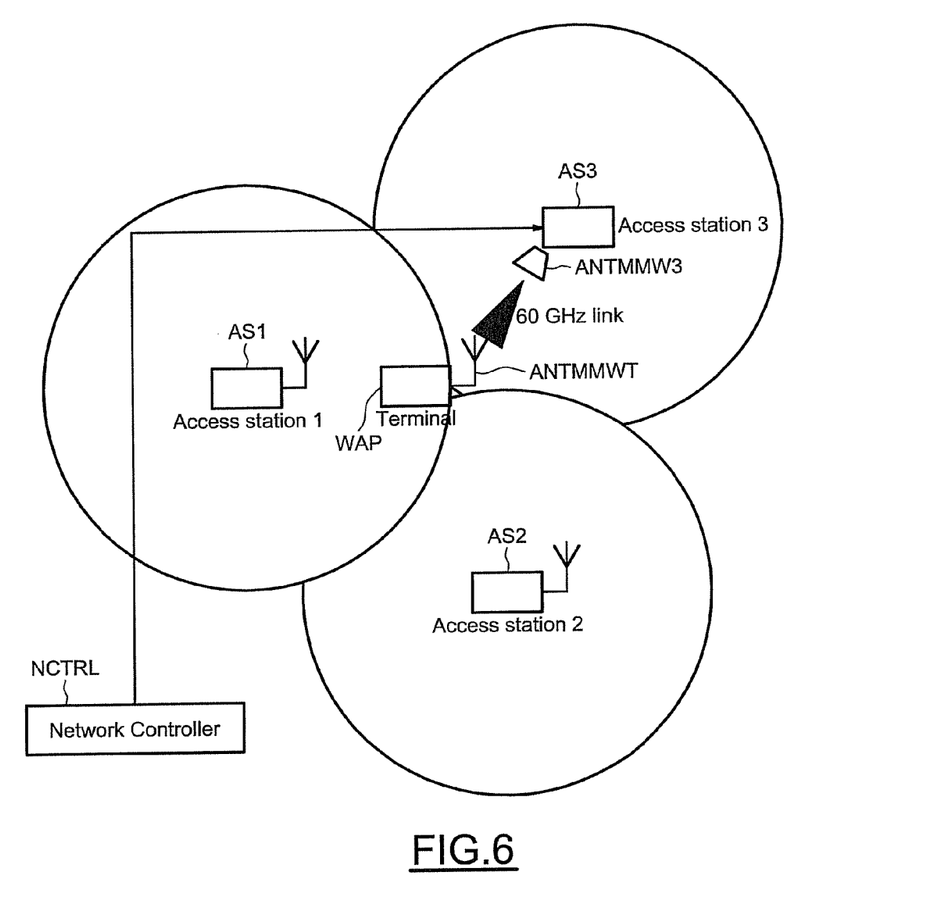

An embodiment of a method will be now described in more detail, with reference to FIGS. 3-7 in particular. As illustrated in FIG. 5, the millimeter-wave communication network comprises a network controller NCTRL and three access stations AS1, AS2, AS3. Although the network controller has been represented outside of the access stations, it may be incorporated within one of the access stations.

A connection between the wireless apparatus WAP and the three access stations is established, using the UWB link. More precisely, as illustrated in FIG. 3, the UWB interface of the wireless apparatus WAP is activated (step 30), while the UWB interface of each access station is also activated.

Then, second information, called here location indication, are communicated by the wireless apparatus WAP to access stations (step 31) and the access stations receive the second information through the UWB link (step 40, FIG. 4). More generally, at this stage, an exchange of information is performed between the wireless apparatus WAP and the access stations in order to precisely localize the wireless apparatus WAP within the network.

The second information comprises, for example, indication intended for determining ranging indication. More particularly, ranging and location operations are performed at the wireless apparatus and at the access stations. Such ranging location operations are known by the person skilled in the art, and are, for example, disclosed in the above mentioned ECMA standard. More precisely, and briefly speaking, ranging frames are exchanged between the wireless apparatus and each access station. Then, a ranging transmit delay and a ranging receive delay are computed and then, a simple-range estimate can be calculated between each access station and the wireless apparatus.

The three-range estimates respectively calculated are then transmitted to the network controller, which can determine the wireless apparatus position (step 41) in relation to the three access stations. Thus, the network controller can define which access station has the best connection to the wireless apparatus WAP for a 60 GHz link.

Once such an access station has been selected (step 42), for example, access station AS3, the network controller NCTRL controls the access station AS3 to connect to a wireless apparatus WAP using the directional 60 GHz link (see FIG. 6), for exchanging the first information between the access station AS3 and the wireless apparatus WAP (step 33, FIGS. 3 and 4).

In this respect, the millimeter-wave communication interface of the wireless apparatus WAP is activated. The high speed point-to-point communication with the wireless apparatus in the 60 GHz band is thus performed.

Figure 7:
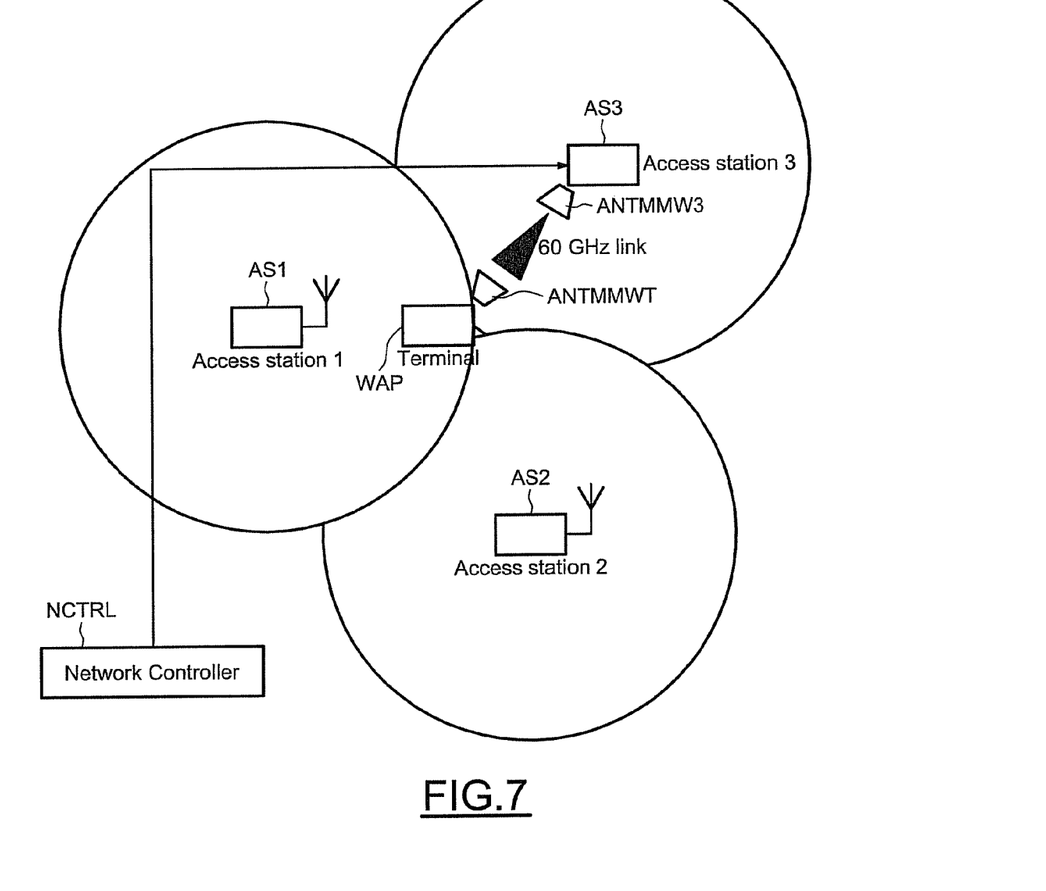

In this embodiment, while the millimeter-wave antenna ANTMMW3 of the access station is a directional high gain antenna, the millimeter-wave antenna ANTMMWT of the wireless apparatus is an omnidirectional antenna. However, in order to reduce the interference potential in the surrounding of the wireless apparatus or terminal WAP, and to obtain a more efficient use of the frequency resources, the antenna ANTMMWT of the terminal may be also a directional antenna as illustrated in FIG. 7. This directional antenna may be a fixed directional antenna or an adaptive antenna array.

In the case of a fixed directional antenna, the user of the terminal WAP may have to steer the antenna towards the selected access station, as illustrated in FIG. 7. In such a case, another indication representing the position of the selected access station, AS3, for example, is communicated to the wireless apparatus and this position indication can be shown for example on the terminal display.

This would allow for simple implementation of terminals, such as a portable video player for ultra high speed downloading of contents in a kiosk area. Another approach would comprise steering the antenna beam towards the selected access station AS3 for example. Such a steering may be performed by the control means or circuitry CTRLM of the wireless apparatus upon reception of the position indication representing the position of the selected access station within the network.

Figure 8:
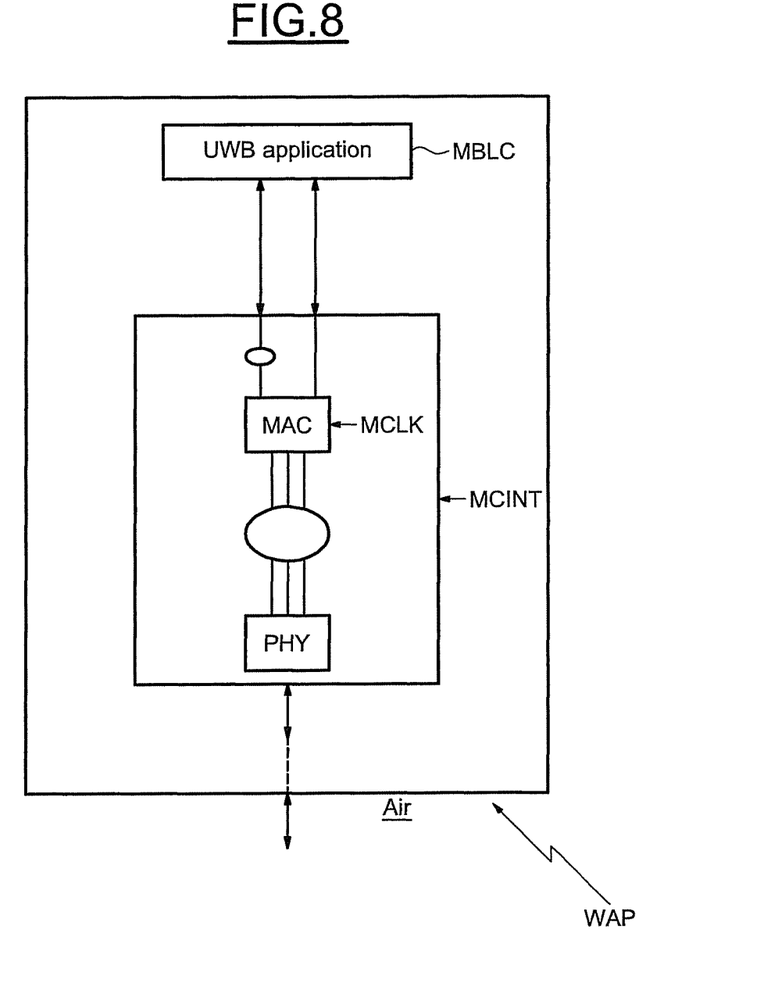
FIGS. 8 to 10 illustrate examples of interfaces of a wireless apparatus according to the invention.

On a hardware point of view, the UWB interface MCINT of the wireless apparatus WAP may be an OFDM based UWB communication interface, connected between an UWB application block MBLC and the communication medium (here, the air), (FIG. 8). As mentioned above, this communication interface MCINT comprises an UWB MAC layer clocked by a clock signal MCLK and connected to the PHY layer and to the UWB application block MBLC.

The MAC layer manages in particular the emission/reception of the UWB data stream and is, for example, incorporated by instructions executed by a control processor globally referenced with the reference sign MAC (FIG. 8). The architecture of the receiving chain RXCH is homologous to that of the transmission chain.

Figure 9:
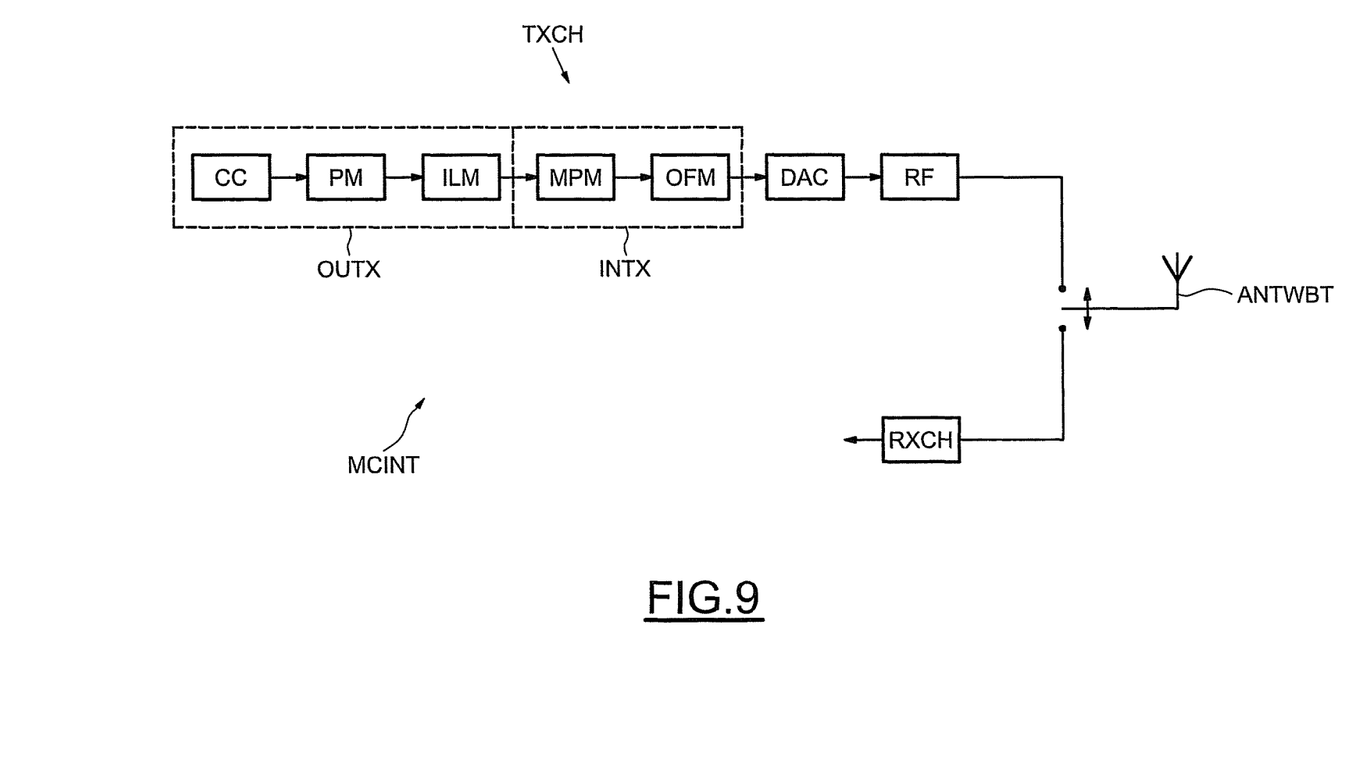

In more detail, the UWB interface MCINT comprises, for example, as illustrated in FIG. 9, a transmission chain TXCH and a receiving chain RXCH, both connected to the UWB antenna ANTWBT. In a typical manner, the transmission chain TXCH comprises an outer transmission block OUTX including an encoder CC, for example, a convolutional encoder, receiving data from source coding means or circuitry and delivering a bits stream to puncturing means PM which delivers a punctured bits stream.

The other means or circuitry of the transmission chain TXCH are interleaving means or circuitry, ILM, followed by mapping means or circuitry MPM, which map the bits into symbols according to a modulation mapping scheme depending on the kind of used modulation, for example, a BPSK modulation or more generally a QAM modulation. The symbols are then delivered to an OFDM modulator OFM, which performs IFFT processing in order to associate each symbol to a sub-carrier and to form OFDM symbols. Each sub-carrier is modulated in accordance with the value of the corresponding symbol.

The OFDM symbols are then processed in a typical radio frequency stage RF before being transmitted on air through antenna ANT. The mapping means or circuitry MPM as well as the OFDM modulator OFM belong to an inner transmission block INTX of the transmission stage.

The outer block OUTX and the inner block INTX may be implemented by instructions executed by the base band processor, and the physical layer PHY incorporates the outer block OUTX and the inner block INTX as well as the RF stage. This control processor may include UWB control means or circuitry for controlling the UWB interface according to a LDC operation mode.

Figure 10:
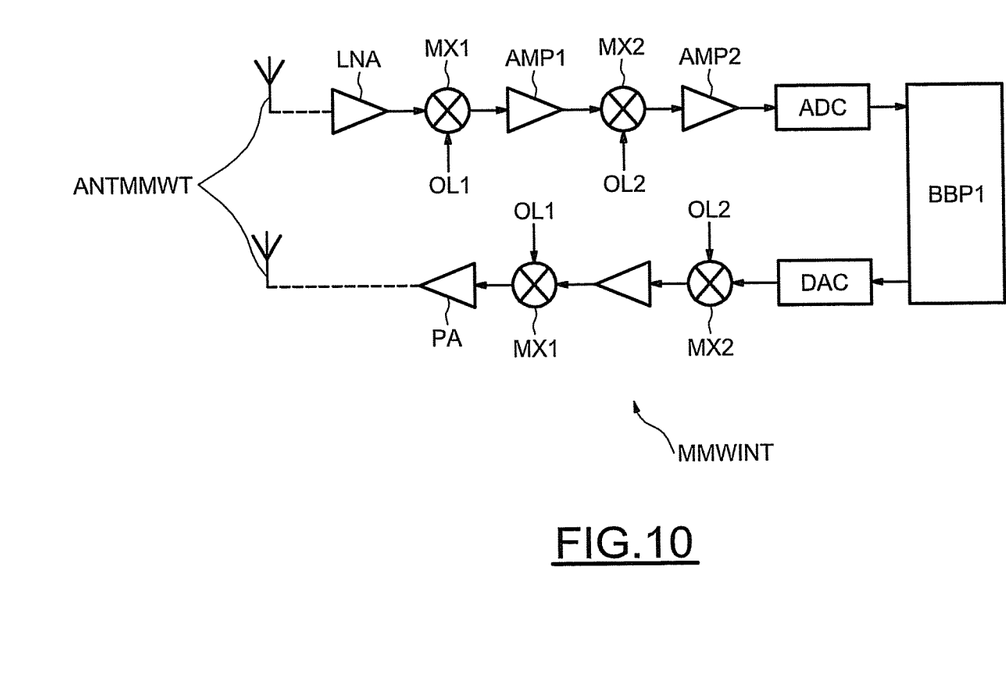

Turning now to the millimeter-wave communication interface MMWINT, an embodiment thereof is schematically illustrated in FIG. 10. Globally speaking, the architecture of such an interface is substantially analogous to the architecture of an UWB interface, but the components thereof are adapted to operate in a frequency, for example, in a 60 GHz band, corresponding to a millimeter wave.

More precisely, as illustrated in FIG. 10, the interface MMWINT comprises also a transmission chain and a receiving chain, both connected to a base band processor BBP1. The transmission chain comprises a low noise amplifier LNA followed by a first mixer MX1 adapted to perform a first frequency transposition by using a first local oscillator signal OL1. A second mixer MX2 is adapted to perform a second frequency transposition into the base band by using a second local oscillator signal OL2. Between the two mixers, amplifier means or circuitry AMP1 are provided, while other amplifier means or circuitry AMP2 are provided downstream the second mixer MX2.

An analog-to-digital converter ADC is connected between the amplifier AMP2 and the base band processor BBP1. The transmission chain TXCH comprises a digital-to-analog converter connected between the base band processor BBP1 and a mixer MX2 performing a frequency up conversion by using the signal OL2.

Another mixer MX1 performs a second frequency up conversion by using the signal OL1. Amplification means or circuitry are provided between both mixers. Further, a power amplifier PA is connected between the mixer MX1 and the antenna.

The person skilled in the art will be able to implement these components taking into account the frequency requirements. Some publications already exist on implementation examples of such interfaces. One can cite, for example, the paper of B. Gaucher: "Completely Integrated 60 GHz ISM Band Front End Chip Set and Test Results," IEEE 802.15-06-0003-00-003c. Jan. 9, 2006, the presentation made by Applicant at the mm-wave workshop, Pavia, Italy, 20/21.11.2006: "Application requirements of mm-Wave Wireless Systems, Results from the WiMedia 60 GHz Study Group," the paper of A. Bourdoux et al., "Air Interface and Physical Layer techniques for 60 GHz WPANs." Symposium on communications and Vehicular Technology, 23 Nov. 2006, Leuven, Belgium, all these documents being incorporated herein by reference.

An application is directed to a wireless download kiosk for video. In this application, the customer will buy/rent a large size video and would like to download the video file as fast as possible. The kiosk might be in a railway station or a supermarket and should be an open area where the detailed position of the receiving apparatus should be flexible. In this case the kiosk area will be covered with three or four access points deploying the combined UWB-60 GHz system. The user would enter the kiosk area and would perform the registration and payment using the UWB air interface. During this process, the access point network can locate the user and the corresponding wireless apparatus. The 60 GHz system now directs the needed beams towards the wireless apparatus based on the location information obtained by the UWB location algorithms. After that, the system starts the ultra high speed download of the video file using the 60 GHz link.

By combining a UWB system in the frequency band below 11 GHz and a system in the 60 GHz band several improvements can be achieved: location information from the UWB device can be used for the antenna control in the 60 GHz band, and an ultra high data rate streaming application can be shifted into the 60 GHz band reducing the need for complex mitigation techniques in the band below 11 GHz. Furthermore, the UWB device used can be a simple LDC based location tracking device. If WPAN and network capabilities are desired, a more complex UWB device based on the WIMEDIA standard can take over this networking capabilities and the 60 GHz devices takes over the highly directive ultra high data rate data streaming when desired.

The protocol in the 60 GHz system may be simplified to a simple point-to-point protocol. The speed of the antenna control is enhanced and thus tracking of moving target is possible. The radio resource management can be optimized based on the availability of the 60 GHz band and the UWB bands below 11 GHz. Due to the characteristics of the UWB system, a very high precision of the location can be guaranteed.

The particular embodiments which have been described are not intended to be limiting. For example, the UWB connection can stay active for the control information and the dynamic update of the position of the terminal. Depending on the implementation architecture and the processing speed, both millimeter-wave communication interface and UWB interface can stay active simultaneously or sequentially, for example, in a TDMA (Time Division Multiplexing Access) protocol.

Further, instead of the 60 GHz band, other bands are possible, like the 40 GHz band or the 80 GHz band or the 24 GHz band. A simple implementation could also include a single access station or device provided with a controllable UWB antenna array. This single access station can use the UWB antenna array for estimating the Direction of Arrival (DOA) of the signal coming from the wireless apparatus WAP and use this information to steer the beam of its directional mm-wave antenna towards the wireless apparatus WAP for exchanging the first information on the 60 GHz link for example through the omnidirectional mm-wave antenna of the wireless apparatus.

It could be also possible to provide the wireless apparatus with a controllable UWB antenna array and with a directional mm-wave antenna, while the access station is provided with an omnidirectional UWB antenna and with an omnidirectional mm-wave antenna. In such a case, the wireless apparatus evaluates the DOA information and steers accordingly, manually or automatically, its directive mm-wave antenna towards the access station. For such variants, the apparatus WAP and/or the access station further comprises means or circuitry adapted to determine DoA of signals emitted from the access station or the apparatus. Such means or circuitry may be for example means or circuitry implementing a well-known ESPRIT or MUSIC algorithm.

Many papers, books and or presentations exist on the well-known ESPRIT or MUSIC algorithm, for example, Advanced Algorithm for Smart Antennas, A. Gershman April 2005. A new approach to array interpolation by generation of artificial shift invariances: interpolated ESPRIT, M. Bühren et al, and Effects of Multipath-Induced Angular Spread on Direction of Arrival Estimators in Array Signal Processing, R. Moses and al. The means or circuitry deliver to equalization means or circuitry a spatial energy distribution information which will permit a processor of the apparatus and/or the access station to analyze the several directions in order to detect the presence of the wireless apparatus or the access station. Depending on the result of the analysis, antenna control means or circuitry located within the processor may then directly determine in the base band the several phases of the several signals to be transmitted through the antennas of the antenna array in order to steer the radio beam in the desired direction.

That which is claimed is:

1. A method for managing operation of a wireless apparatus comprising a millimeter-wave communication interface having an antenna to exchange information with at least one other millimeter-wave communication device within a frequency band corresponding to a millimeter wave, and an ultra-wide band (UWB) communication interface separate from the millimeter-wave communication interface, the method comprising:

activating the UWB communication interface for exchanging information with the at least one other millimeter-wave communication device, the information for locating the wireless apparatus with respect to the at least one other millimeter-wave communication device and comprising an indication for determining a direction of arrival of signals exchanged between the wireless apparatus and the at least one other millimeter-wave communication device;

receiving via the UWB communication interface an additional indication representing a position of the at least one other millimeter-wave communication device;

subsequent to the activating of the UWB communication interface, steering the antenna toward the at least one other millimeter-wave communication device based upon the additional indication from the UWB communication interface, and activating the millimeter-wave communication interface.

2. A method according to claim 1, wherein the information further comprises an indication for determining ranging information.

3. A method according to claim 1, further comprising steering the antenna toward the at least one other millimeter-wave communication device based upon the determined direction of the arrival of signals.

4. A method according to claim 1, wherein the UWB communication interface is kept active during operation of the millimeter-wave communication interface.

5. A method according to claim 1, wherein activating the UWB communication interface comprises controlling the UWB communication interface according to a low duty cycle (LDC) operation mode.

6. A method according claim 1, wherein the millimeter-wave communication interface comprises a 60 GHz communication interface.

7. A method according to claim 1, wherein the UWB communication interface is for exchanging information in a frequency band below 11 GHz.

8. A method according to claim 1, wherein the at least one other millimeter-wave communication device defines an access station of a millimeter-wave communication network.

9. A method for managing operation of a wireless apparatus comprising a millimeter-wave communication interface having an antenna to exchange information with at least one other millimeter-wave access station of a millimeter-wave communication network within a frequency band corresponding to a millimeter wave, and an ultra-wide band (UWB) communication interface separate from the millimeter-wave communication interface, the method comprising:

activating the UWB communication interface for exchanging information with the at least one other millimeter-wave access station, the information for locating the wireless apparatus with respect to the at least one other millimeter-wave access station;

receiving via the UWB communication interface an additional indication representing a position of the at least one other millimeter-wave access station; and subsequent to the activating of the UWB communication interface, steering the antenna toward the at least one other millimeter-wave access station based upon the additional indication from the UWB communication interface, and activating the millimeter-wave communication interface;

the information comprising an indication for determining a direction of arrival of signals exchanged between the wireless apparatus and the at least one other millimeter-wave access station and an indication for determining ranging information.

10. A wireless apparatus comprising:

a millimeter-wave communication interface comprising an antenna and configured to exchange information with at least one other millimeter-wave communication device within a frequency band corresponding to a millimeter wave; and an ultra-wide band (UWB) communication interface separate from said millimeter-wave communication interface, coupled to the millimeter-wave communication interface and comprising control circuitry configured to activate the UWB communication interface for exchanging information with the at least one other millimeter-wave communication device;

the information for locating the wireless apparatus with respect to the at least one other millimeter-wave communication device and comprising an indication for determining a direction of arrival of signals exchanged between the wireless apparatus and the at least one other millimeter-wave communication device;

said UWB communication interface configured to receive an additional indication representing a position of the at least one other millimeter-wave communication device;

said millimeter-wave communication interface configured to, subsequent to the activating of the UWB communication interface, steer the antenna toward the at least one other millimeter-wave communication device based upon the additional indication from said UWB communication interface, and activate the millimeter-wave communication interface.

11. A wireless apparatus according to claim 10, wherein the information comprises an indication for determining ranging indication.

12. A wireless apparatus according to claim 10, wherein the millimeter-wave communication interface is configured to steer the antenna toward the at least one other millimeter-wave communication device based upon the determined direction of the arrival of signals.

13. A wireless apparatus according to claim 10, wherein said control circuitry is further configured to control the UWB communication interface according to a low duty cycle (LDC) operation mode.

* * * * *